United States Patent
Liu

(10) Patent No.: US 11,622,573 B2
(45) Date of Patent: *Apr. 11, 2023

(54) ELECTRONIC CIGARETTE WITH TEMPERATURE PROTECTION

(71) Applicant: Shenzhen Eigate Technology Co., Ltd., Shenzhen (CN)

(72) Inventor: Tuanfang Liu, Shenzhen (CN)

(73) Assignee: SHENZHEN EIGATE TECHNOLOGY CO., LTD., Shenzhen (CN)

( * ) Notice: Subject to any disclaimer, the term of this patent is extended or adjusted under 35 U.S.C. 154(b) by 336 days.

This patent is subject to a terminal disclaimer.

(21) Appl. No.: 16/931,365

(22) Filed: Jul. 16, 2020

(65) Prior Publication Data

US 2022/0021043 A1 Jan. 20, 2022

(51) Int. Cl.
*A24F 15/01* (2020.01)
*H01M 10/63* (2014.01)

(52) U.S. Cl.
CPC ............. *A24F 15/01* (2020.01); *H01M 10/63* (2015.04)

(58) Field of Classification Search
CPC .. H01M 10/486; H01M 10/63; H01M 50/581; A24F 15/01; A24F 40/53
See application file for complete search history.

(56) References Cited

U.S. PATENT DOCUMENTS

| | | | |
|---|---|---|---|
| 2020/0000146 A1* | 1/2020 | Anderson | A24F 40/40 |
| 2020/0221780 A1* | 7/2020 | Qiu | H02J 7/00309 |
| 2022/0021043 A1* | 1/2022 | Liu | A24F 40/53 |
| 2022/0142258 A1* | 5/2022 | Halliday | A24F 40/57 |

* cited by examiner

*Primary Examiner* — James Harvey
(74) *Attorney, Agent, or Firm* — Matthias Scholl P.C.; Matthias Scholl

(57) ABSTRACT

An electronic cigarette including an atomization assembly and a battery assembly. The atomization assembly is disposed on the battery assembly. The battery assembly includes a temperature protection control unit. The temperature protection control unit includes a control panel. The control panel includes a temperature protection sensing unit configured to detect an internal temperature of the battery assembly and transmit a signal with regard to the internal temperature to the control panel. When the internal temperature of the battery assembly is over 75° C., the control panel stops working, and the atomization assembly is unable to work.

2 Claims, 5 Drawing Sheets

ELECTRONIC CIGARETTE WITH TEMPERATURE PROTECTION

BACKGROUND

The disclosure relates to an electronic cigarette.

Known electronic cigarettes have no over-temperature protection function. When the electronic cigarettes work continuously or an internal short circuit occurs, the temperature inside the battery rises sharply.

SUMMARY

The disclosure provides an electronic cigarette comprising an atomization assembly and a battery assembly. The battery assembly comprises a temperature protection control unit. The temperature protection control unit comprises a control panel; the control panel comprises a temperature protection sensing unit configured to detect an internal temperature of the battery assembly and transmit a signal with regard to the internal temperature to the control panel; when the internal temperature of the battery assembly is over 75° C., the control panel stops working, and the atomization assembly is unable to work.

The temperature protection control unit further comprises a spring contact and a battery; an output end of the battery is connected to an input end of the control panel; an output end of the control panel is connected to the spring contact to supply power for the atomization assembly; and the spring contact is connected to an input end of the atomization assembly.

DETAILED DESCRIPTION

To further illustrate, embodiments detailing an electronic cigarette are described below. It should be noted that the following embodiments are intended to describe and not to limit the disclosure.

Figure 1:
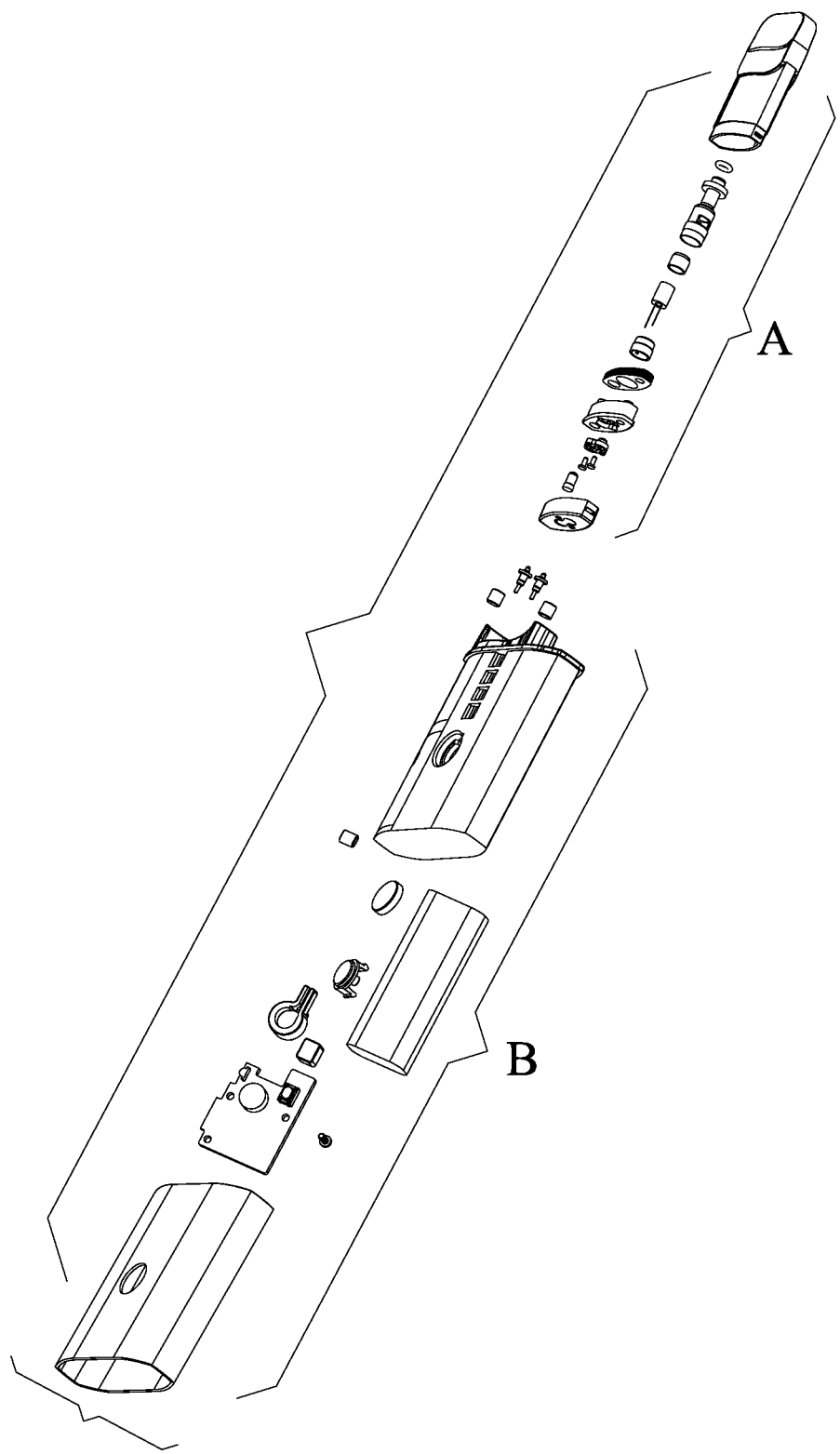
FIG. 1 is an exploded view of an electronic cigarette according to one embodiment of the disclosure.
Figure 2:
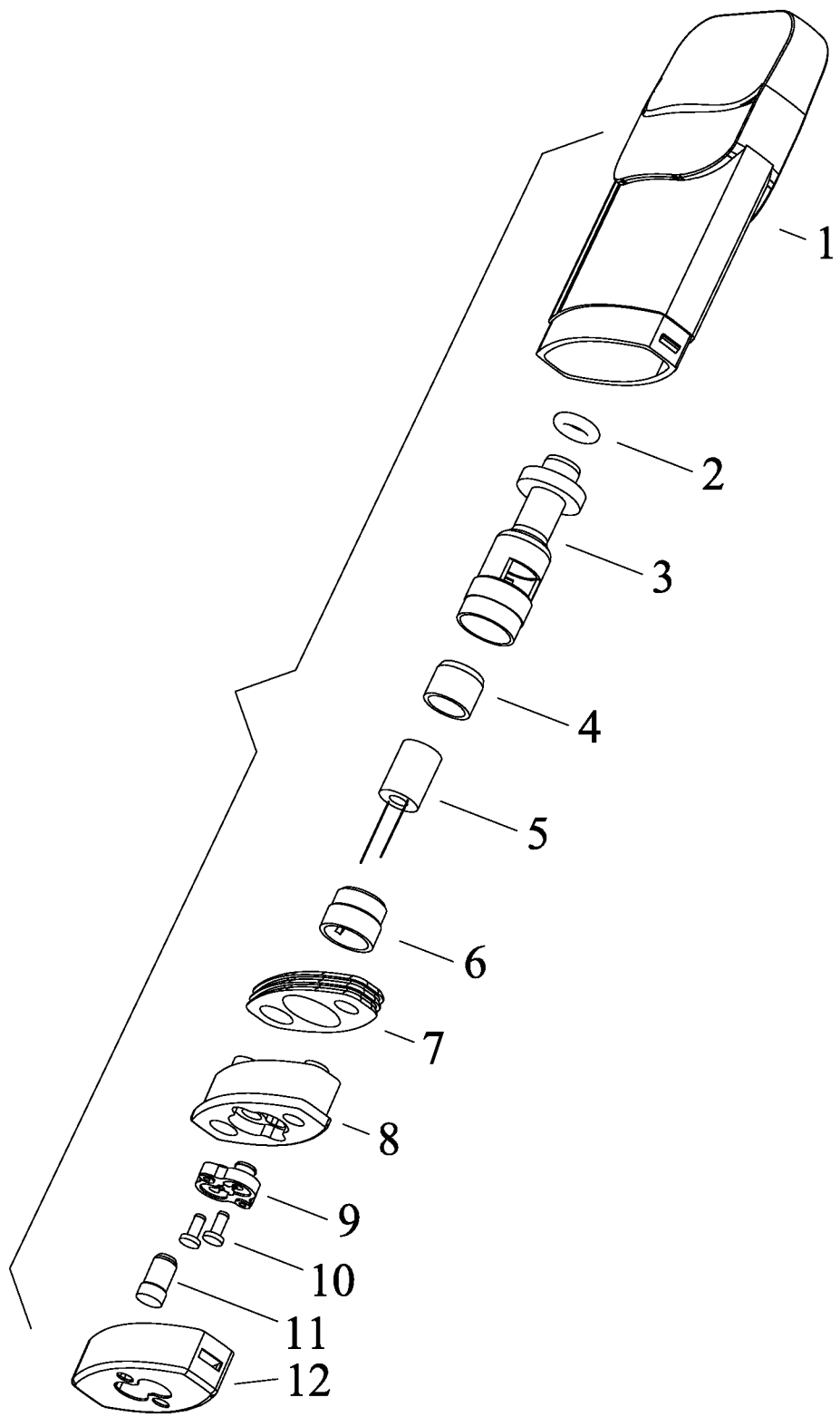
FIG. 2 is an exploded view of an atomization assembly of an electronic cigarette in FIG. 1.
Figure 3:
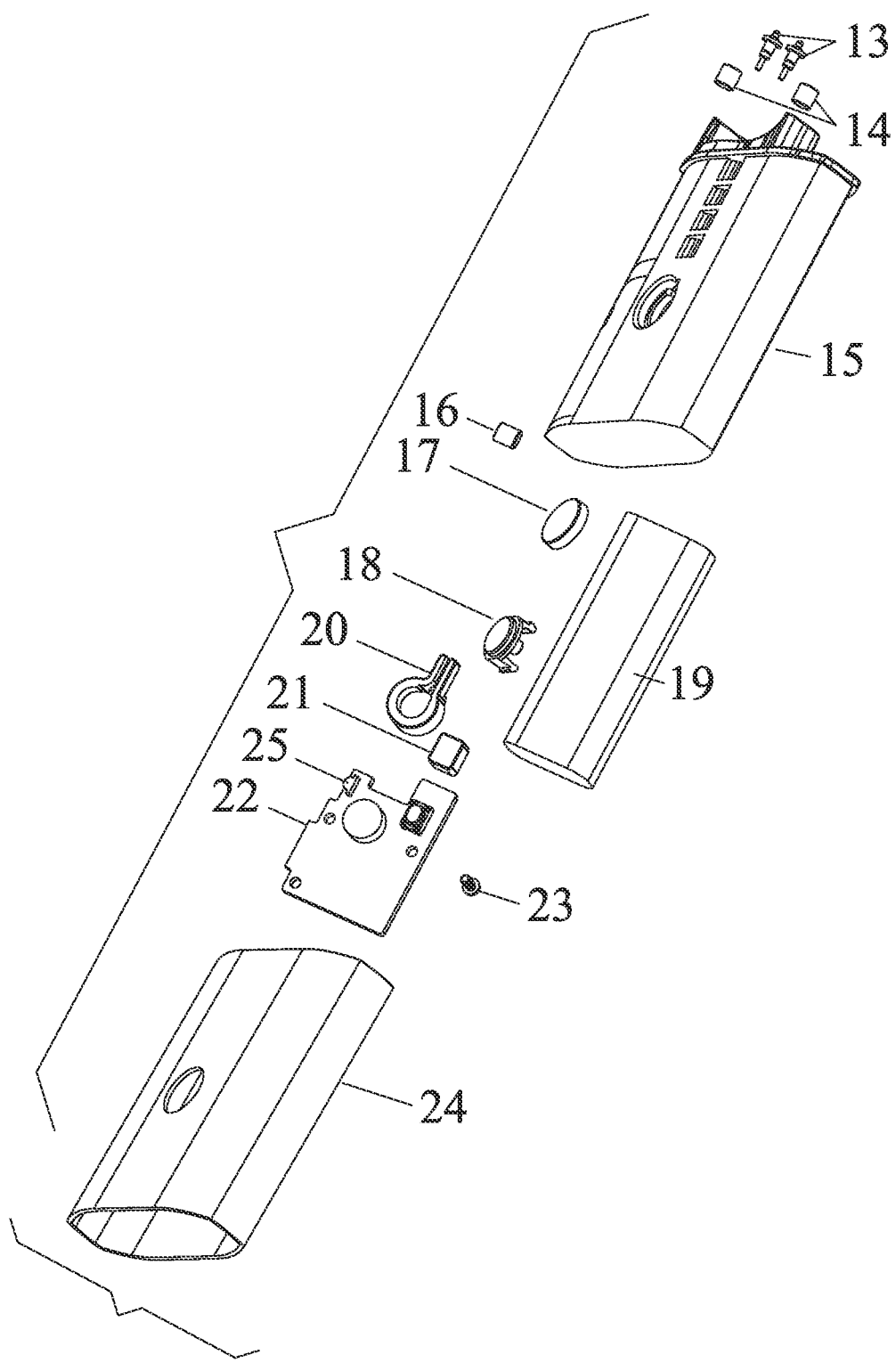
FIG. 3 is an exploded view of a battery assembly of an electronic cigarette in FIG. 1.
Figure 4:
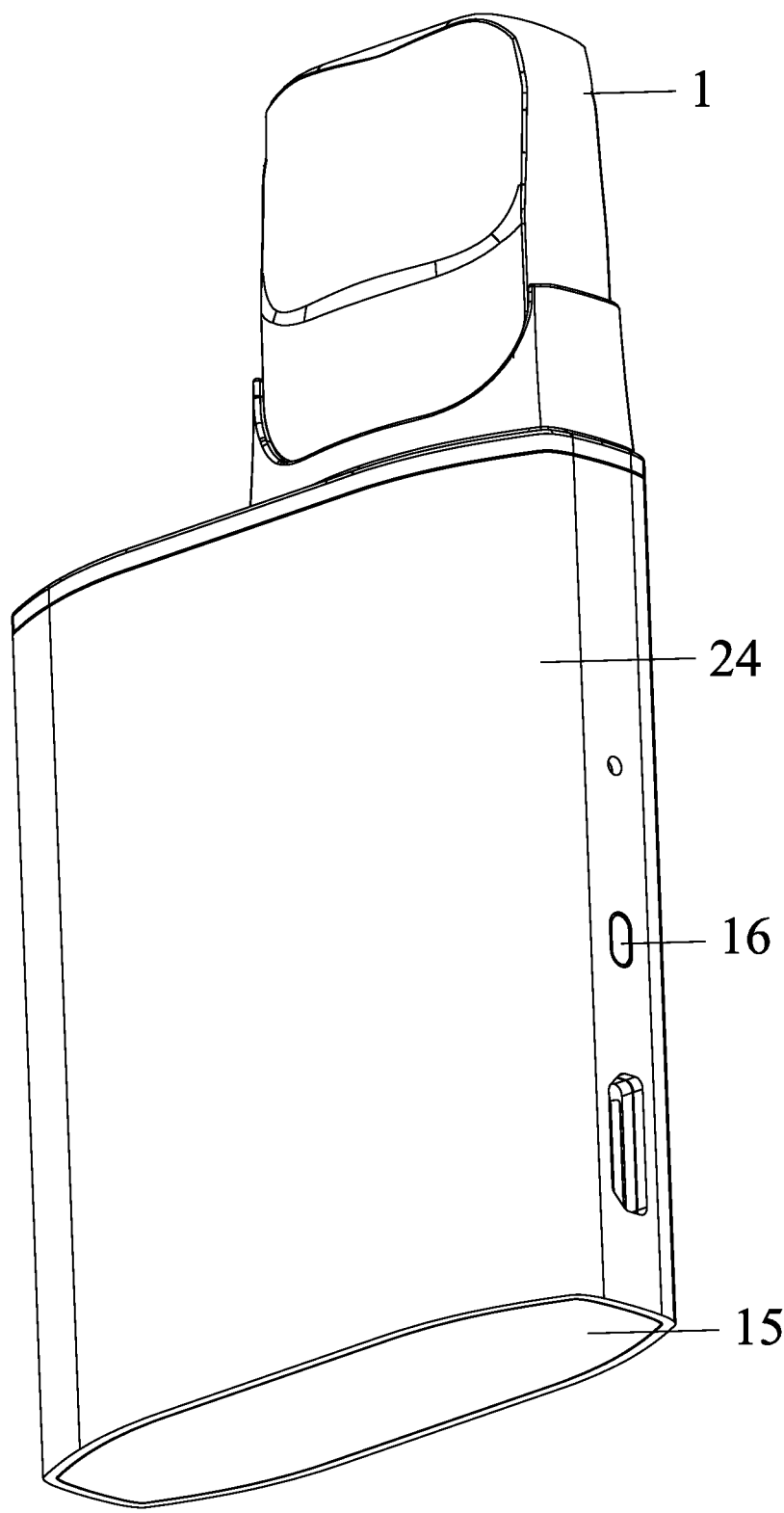
FIG. 4 is a schematic diagram of an electronic cigarette according to one embodiment of the disclosure.
Figure 5:
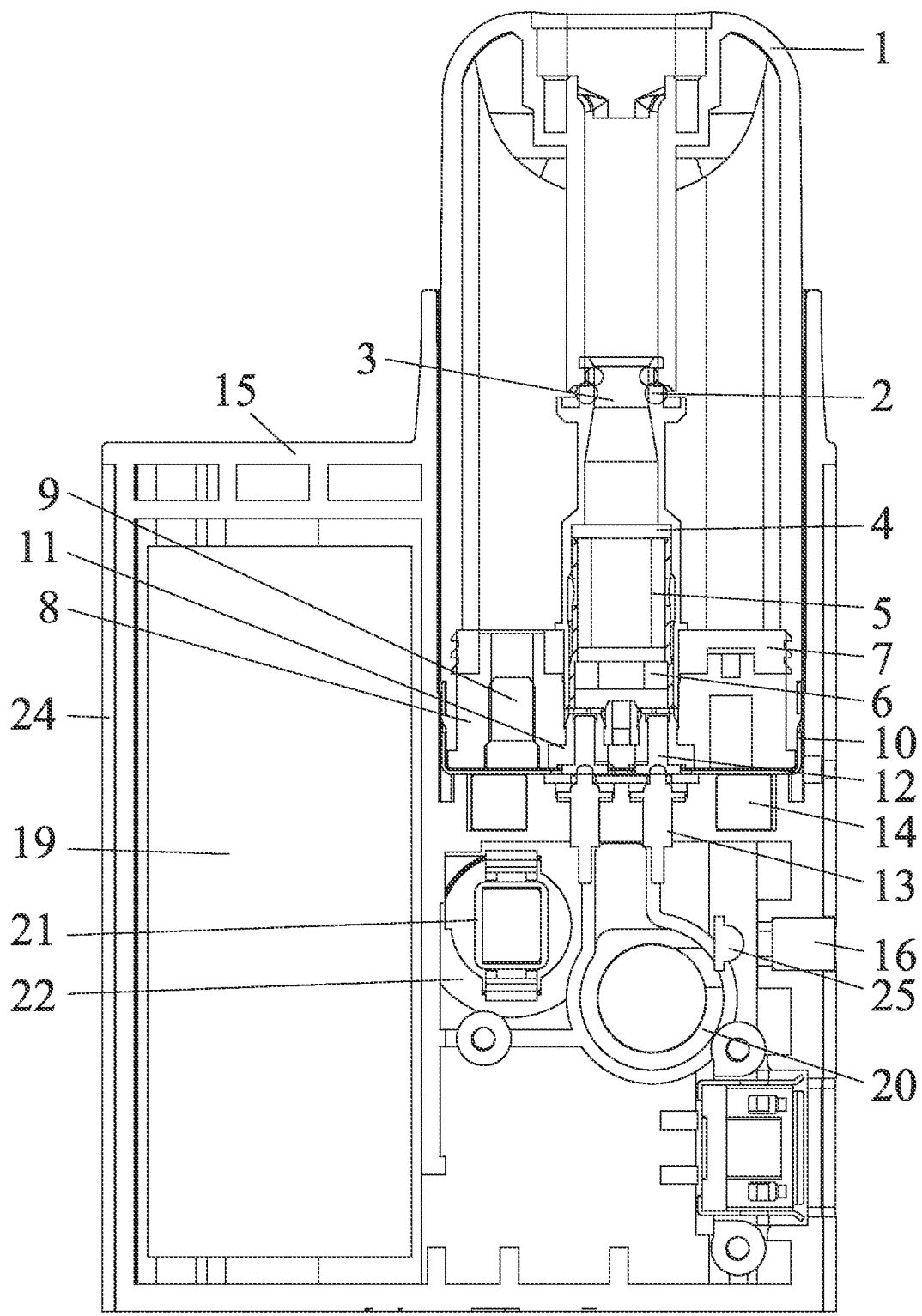
FIG. 5 is a sectional view of an electronic cigarette according to one embodiment of the disclosure.

As shown in FIGS. 1-5, an electronic cigarette comprises an atomization assembly A and a battery assembly B. The atomization assembly A is disposed on the battery assembly B.

The atomization assembly A comprises an e-liquid tank 1, a first seal ring 2, a limit cover 3, a second seal ring 4, a ceramic core 5, a third seal ring 6, a seal gasket 7, a base 8, a silica pad 9, a joint 10, a seal plug 11, an iron shell 12. The first seal ring 2 is disposed on the top of the limit cover 3. The second seal ring 4 is disposed on the ceramic core 5. The third seal ring 6 is disposed on the bottom of the ceramic core 5. The second seal ring 4, the ceramic core 5, and the third seal ring 6 are disposed in the limit cover 3. The seal gasket 7 is wrapped around the base 8. The limit cover 3 is disposed on the seal gasket 7. The silica pad 9 is inserted in the base 8. The joint 10 is inserted in the silica pad 9. The seal plug 11 is disposed on the bottom of the base 8. The base 8 is disposed in the e-liquid tank 1, and the iron shell 12 is wrapped around the base 8.

The battery assembly B comprises a spring contact 13, a magnet 14, a support frame 15, a lampshell 16, a cap 17, a button 18, a battery 19, a silica ring 20, a silica gasket 21, a control panel 22, a bolt 23, and a housing 24. The spring contact 13 and the magnet 14 are disposed on the top of the support frame 15 for electric conduction and connection to the atomization assembly. The battery 19 comprises an output end connected to an input end of the control panel 22 to supply power to the control panel 22. The silica ring 20 is disposed on a pneumatic switch on the control panel 22. The silica gasket 21 is disposed on a power button of the control panel 22 to protect the power button and exhibits insulation function. The cap 17 is disposed on the silica gasket 21 to ensure the stress balance when the power button is pressed. The button 18 is disposed on the cap 17. The control panel 22 is disposed in the support frame 15 and is fixed by the bolt 23. The support frame 15 is disposed in the housing 24. The lampshell 16 passes through the openings of the housing 24 and the support frame 15 and is fixed on an LED light element on the control panel 22, to gather and transmit the light out of the battery.

The battery assembly comprises a temperature protection control unit. The control panel 22 is disposed on the temperature protection control unit. The control panel 22 comprises a temperature protection sensing unit 25 configured to detect an internal temperature of the battery assembly and transmit a signal with regard to the internal temperature to the control panel 22.

It will be obvious to those skilled in the art that changes and modifications may be made, and therefore, the aim in the appended claims is to cover all such changes and modifications.

What is claimed is:

1. An electronic cigarette, comprising: an atomization assembly and a battery assembly; the battery assembly comprising a a battery, a control panel, and a housing for the battery and the control panel;

wherein:
the control panel comprises a temperature protection sensing unit; and
the temperature protection sensing unit is disposed on a distal end of the control panel from the battery and is configured to detect an internal temperature of the battery assembly and transmit a signal with regard to the internal temperature to the control panel; when the internal temperature of the battery assembly is over 75° C., the control panel stops working, and the atomization assembly is unable to work.

2. The electronic cigarette of claim 1, wherein the battery assembly further comprises a spring contact; an output end of the battery is connected to an input end of the control panel; an output end of the control panel is connected to the spring contact to supply power for the atomization assembly; and the spring contact is connected to an input end of the atomization assembly.

* * * * *